United States Patent
Isenhour et al.

(10) Patent No.: US 9,354,406 B2
(45) Date of Patent: May 31, 2016

(54) CARRIER MODULES FOR OPTICAL SUBASSEMBLIES AND METHODS FOR ASSEMBLING OPTICAL PACKAGES

(71) Applicant: Corning Cable Systems LLC, Hickory, NC (US)

(72) Inventors: Micah Colen Isenhour, Lincolnton, NC (US); Dennis Michael Knecht, Hickory, NC (US); Christopher Paul Lewallen, Hudson, NC (US); James Phillip Luther, Hickory, NC (US); Timothy James Orsley, San Jose, CA (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 434 days.

(21) Appl. No.: 13/901,990

(22) Filed: May 24, 2013

(65) Prior Publication Data
US 2014/0348478 A1 Nov. 27, 2014

(51) Int. Cl.
*G02B 6/42* (2006.01)
*G02B 6/44* (2006.01)

(52) U.S. Cl.
CPC ............ *G02B 6/4236* (2013.01); *G02B 6/4232* (2013.01); *G02B 6/4457* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 5,469,526 | A * | 11/1995 | Rawlings | 385/135 |
| 6,263,143 | B1 * | 7/2001 | Potteiger et al. | 385/135 |
| 7,785,020 | B2 * | 8/2010 | Kim et al. | 385/92 |
| 8,654,440 | B2 * | 2/2014 | Nakagawa | 359/344 |
| 2002/0168147 | A1 | 11/2002 | Case et al. | 385/53 |
| 2010/0215317 | A1 | 8/2010 | Rolston et al. | 385/53 |

* cited by examiner

*Primary Examiner* — Tina Wong

(57) ABSTRACT

An optical subassembly includes an optical device assembly including an active device and an optical fiber cable operably connected to the active device that sends optical signals to the active device and receives optical signals from the active device. A carrier module has a cable receiving space that receives the optical fiber cable therein. The carrier module includes a device support structure that supports the active device for placement on a mating surface during controlled manufacturing.

30 Claims, 9 Drawing Sheets

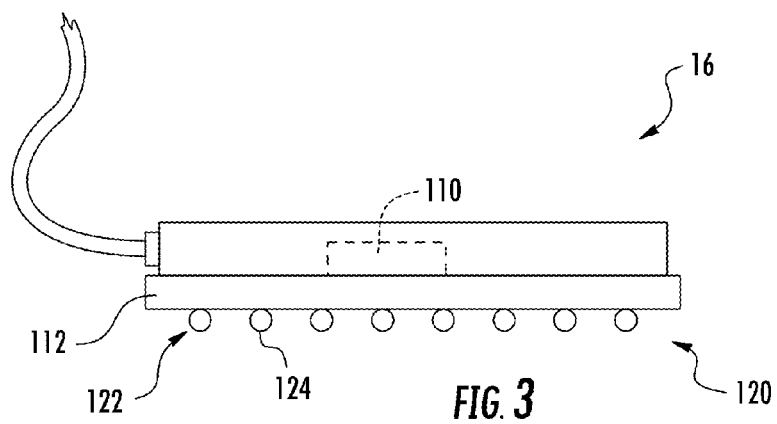
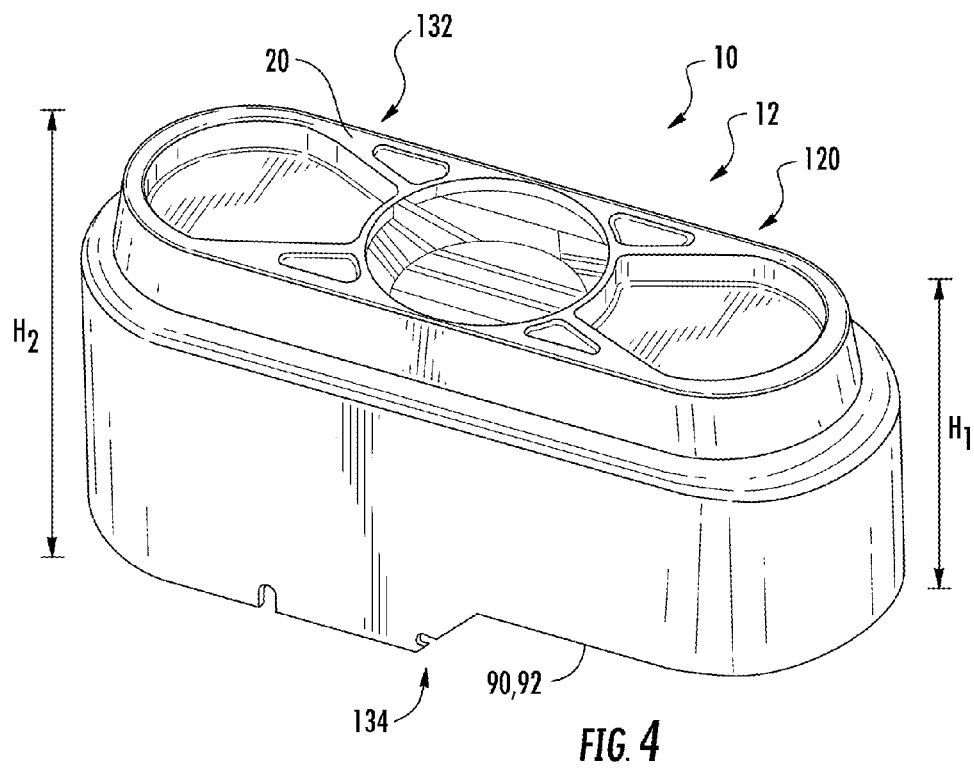

CARRIER MODULES FOR OPTICAL SUBASSEMBLIES AND METHODS FOR ASSEMBLING OPTICAL PACKAGES

BACKGROUND

The disclosure relates generally to systems and methods for assembling optical packages and more particularly to carrier modules for optical subassemblies and for use in assembling optical packages.

No admission is made that any reference cited herein constitutes prior art. Applicant expressly reserves the right to challenge the accuracy and pertinency of any cited documents.

Optical solutions are being increasingly employed in the computer industry. Copper traces have been adequate to carry information from interiors of large circuit boards to their peripheries where they could either be joined to copper cables or have their signals converted to optical signals and passed to an optical fiber. As computing speeds have increased, a variety of changes have been desired. For example, it may be desirable to place optical transceivers closer to processors. Due to continued migration toward higher and higher processing speeds, integrated silicon photonics has come into play as a replacement for VCSEL technology and a shift toward single mode fiber may be desired. However, alignment accuracies needed for single mode fibers can be difficult to manage. What is needed is fiber coupling that facilitates interconnection between components.

SUMMARY

One embodiment of the disclosure relates to an optical subassembly. The optical subassembly includes an optical device assembly including an active device and an optical fiber cable operably connected to the active device that sends optical signals to the active device and receives optical signals from the active device. A carrier module may have a cable receiving space, for example, a volume that receives and guides the optical fiber cable therein in a controlled bend that does not exceed the bend radius requirements for the optical fiber, for example, in a coiled arrangement. The carrier module includes a device support structure that supports the active device for placement on a mating surface during a controlled manufacturing process, for example, a pick and place operation.

An additional embodiment of the disclosure relates to a method of providing an optical subassembly. The method includes forming a bend controlled arrangement or winding of an optical fiber cable of an optical device assembly. The winding may be located within a cable receiving space or volume of a carrier module. The optical fiber cable may have a first terminal end operably connected to an active device and a second terminal end located in the volume. The active device may be supported using a device support structure of the carrier module for placement on a mating surface during a pick and place operation.

An additional embodiment of the disclosure relates to a pick and place method of connecting an active device to a mating surface. The method includes positioning an optical subassembly on the mating surface using a pick and place apparatus. The optical subassembly includes an optical device assembly comprising the active device and an optical fiber cable operably connected to the active device that sends optical signals to the active device and receives optical signals from the active device. A carrier module has a cable receiving space or volume having the optical fiber cable therein in a bend controlled arrangement. The carrier module includes a device support structure that supports the active device for placement on the mating surface. The active device may be operably connected to the mating surface.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3 is a schematic illustration of an embodiment of a transceiver module for use in the optical subassembly of FIG. 1;

FIG. 4 is a side, perspective view of the optical subassembly of FIG. 1;

DETAILED DESCRIPTION

Embodiments described herein are generally directed to systems and methods for assembling optical packages forming or employing integrated silicon photonic devices and more particularly to carrier modules for optical subassemblies and for use in assembling optical packages in a "pick and place" type of fashion. The systems and methods use a carrier module that carries an active device, such as an integrated circuit (IC), operatively pre-connected to an optical fiber to form an optical subassembly. The optical subassembly can then be located, for example, on a printed circuit board (PCB) or some other location to establish a connection therebetween.

Figure 1:
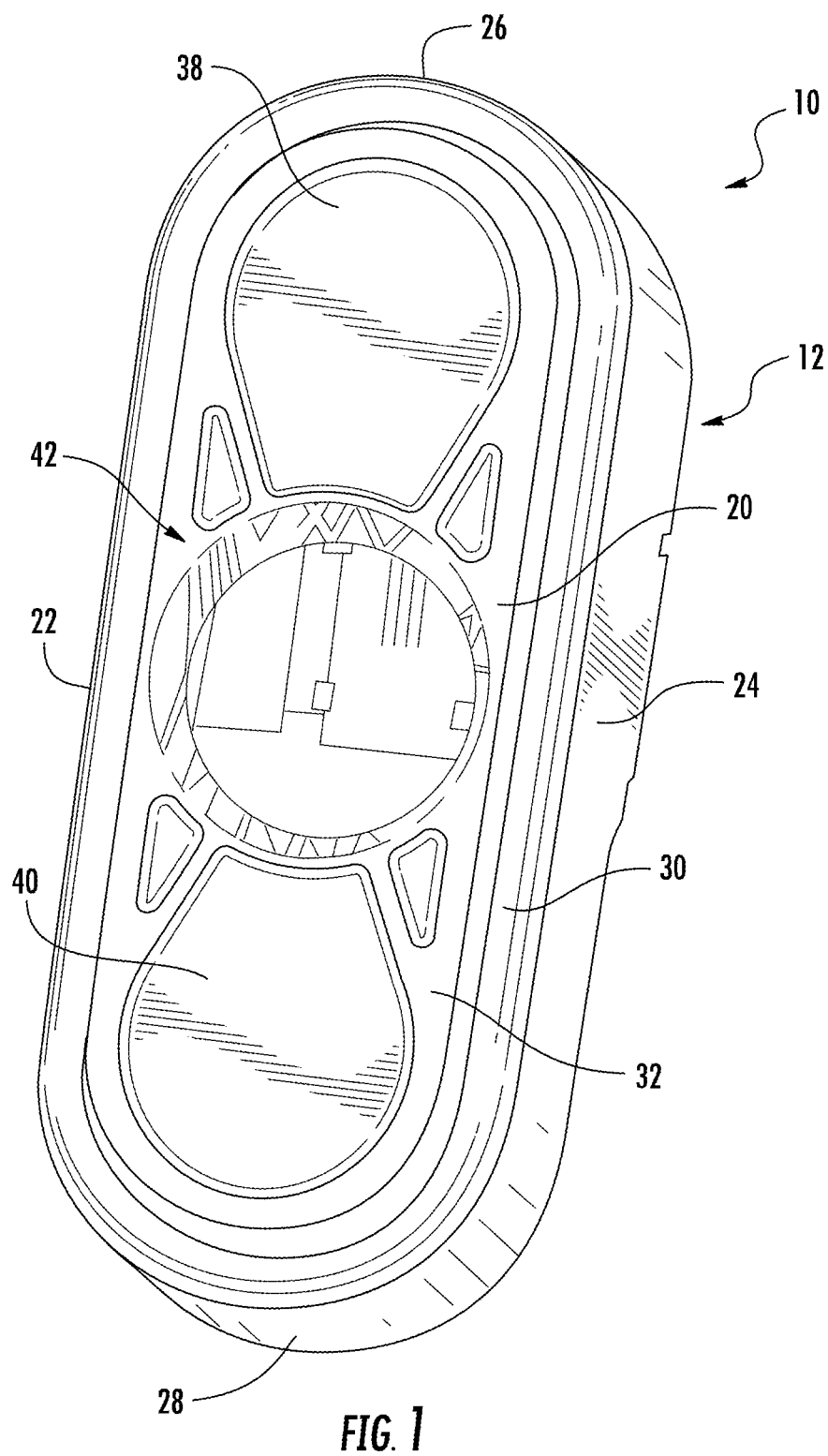
FIG. 1 is a top, perspective view of one embodiment of an optical subassembly.
Figure 2:
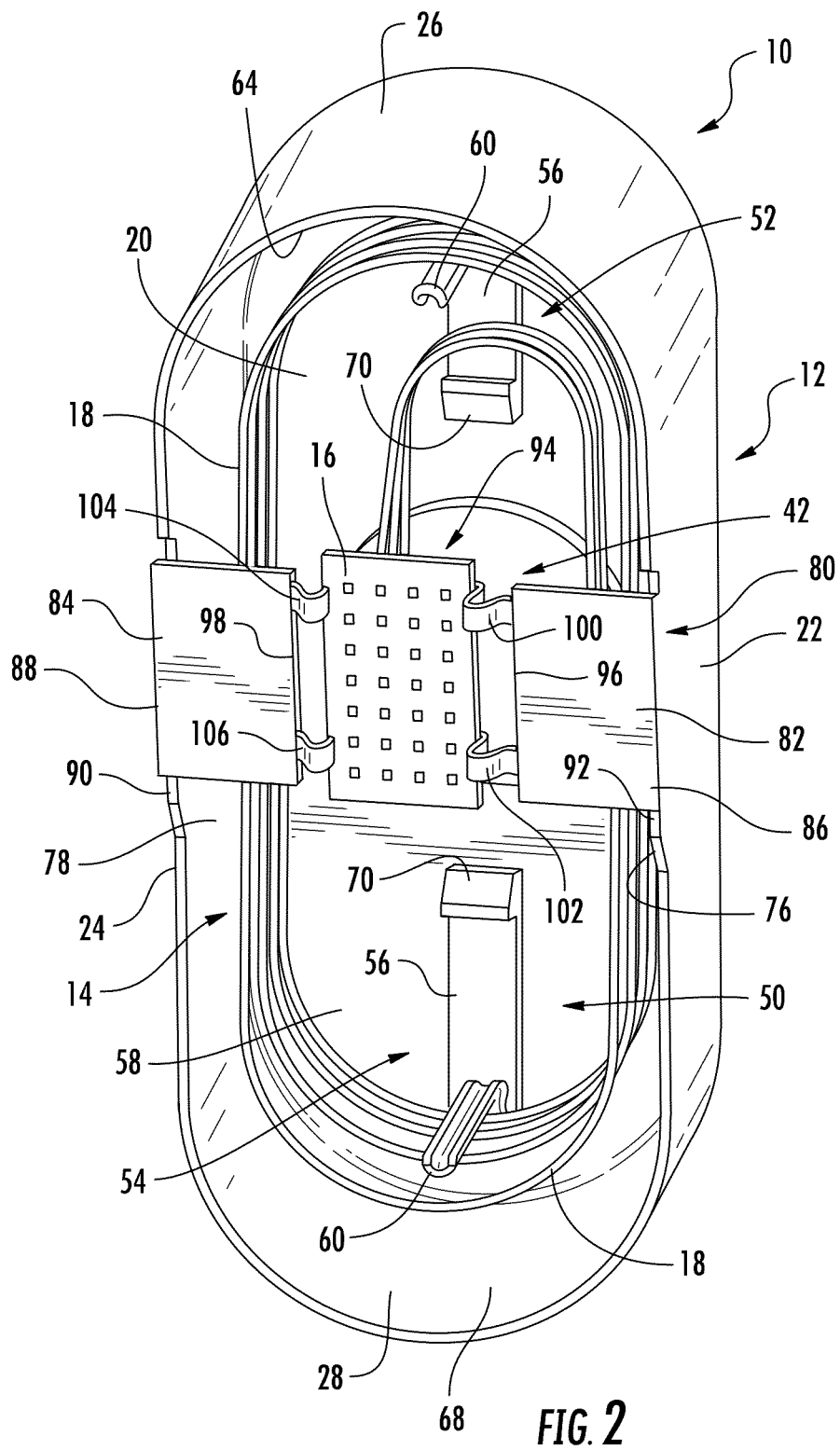
FIG. 2 is a bottom, perspective view of the optical subassembly of FIG. 1.

Referring to FIGS. 1 and 2, an optical subassembly 10 generally includes a carrier module 12 and an active optical device assembly 14 including an active device 16 and an optical fiber cable 18 (FIG. 2) pigtailed to the active device 16. As used herein, the term "optical device" also includes electro-optical devices. Referring particularly to FIG. 1, the carrier module 12 includes a cover portion 20 and side portions 22 and 24 that extend outwardly from the cover portion 20 in a substantially perpendicular fashion. In other embodiments, the side portions 22 and 24 may be at an angle less or greater than 90 degrees to the cover portion 20. Further, while the side portions 22 and 24 are relatively straight, they may be any other suitable shape, depending on the needs and constraints during the assembly process. The carrier module further includes end portions 26 and 28 that may be somewhat rounded in shape. As can be seen by FIG. 2, such a rounded, track shape can provide a guide that facilitates winding or controlled bending, such as forming a coil or accordion of the optical fiber cable 18 within the carrier module 12, while maintaining or controlling a predetermined bend radius.

A transition 30 (e.g., curved, square, etc.) may be provided between the side portions 22, 24, end portions 26, 28 and the cover portion 20. The cover portion 20 may include a generally raised cover surface 32 that may be surrounded by side portions 34 and 36 and end portions 38 and 40. As with the side portions 22 and 24 and end portions 26 and 28, the side portions 34 and 36 may be relatively straight and the end portions may be somewhat rounded in shape. As above, other configurations are possible.

Formed in the cover surface 32 are various recessed regions 38 and 40. The recessed regions 38 and 40 may be of any suitable shapes and may be used, for example, for alignment or placement during assembly, grasping of the carrier module 12 (e.g., by a gripper), or may be used for reducing weight and amount of material used to form the carrier module 12. Raised regions may also be provided. A viewing area 42 (e.g., an air space, glass, plastic or screen window) may be provided to allow viewing through the cover surface 32 and the active device 16 located within the carrier module 12 (e.g., in a look up and/or look down fashion). Such an arrangement can facilitate placement of the active device 16 during assembly, for example, to a PCB or other location.

Referring to FIG. 2, the cover portion 20, side portions 22 and 24, and end portions 26 and 28 together provide a cable receiving space or volume 50 into which at least a portion of the active optical device assembly 14 can be held in a somewhat sheltered or partially enclosed environment. As indicated above, the active optical device assembly 14 includes the active device 16 and the optical fiber cable 18 with the optical fiber cable 18 pre-connected to the active device 16 (e.g., using any suitable technique such as butt-coupling or gratings). Regardless of the coupling technique, it may be desirable to assemble the active optical device assembly 14 "off-board" and, in many embodiments, before insertion or connection to the carrier module 12 forming the optical subassembly 10.

Referring still to FIG. 2, the optical fiber cable 18 may be coiled within the volume 50 of the carrier module 12 in a somewhat flat coil. The side portions 22, 24 and end portions 26, 28 can form a continuous track or guide that can be used to maintain the coiled shape of the optical fiber cable 18. In some embodiments, winding or coil guide structures 52 and 54 may be provided that can be used to guide and constrain the optical fiber cable 18 in the desired shape, or maintain a bend radius of the optical fiber cable 18 above a predetermined value. In the illustrated embodiment, each coil guide structure 52 and 54 includes a base 56 that may be connected to a ceiling 58 of the cover portion 20 and a retaining projection 60 that extends outwardly from the base 56 and adjacent its respective end portion 26 and 28. In some embodiments, a gap 62 between the retaining projection 60 and the respective inner surfaces 64 and 68 of the end portions 26 and 28 may be about the same as the outer diameter of the optical fiber cable 18. In some embodiments, positions of the retaining projections 60 may be adjustable to adjust the size of the gaps 62. In some embodiments, the coil guide structures 52 and 54 further include positioning hooks 70 that may be spaced from the retaining projections 60. The positioning hooks 70 can also be used to control a bend radius of a portion 72 of the optical fiber cable 18 leading to the active device 16. While the retaining projections 60 and the positioning hooks 70 may be located on the same base 56, they may be located on different bases and may/or may not be adjustable, e.g., to accommodate a variety of optical fiber sizes including diameters and lengths. Further, while the retaining projections 60 may be located adjacent the inner surfaces 64 and 68 of the end portions 26 and 28, alternatively or in addition, they may be located adjacent inner surfaces 76 and 78 of the side portions 22 and 24.

The carrier module 12 further includes a device support structure 80 that includes a pair of device support, for example, in the form of extensions such as arms 82 and 84. Each device support arm 82 and 84 may be connected and cantilevered at ends 86 and 88 to a respective ledge 90 and 92 of the side portions 34 and 36. The device support arms 82 and 84 extend outwardly from their respective side portions 34 and 36 toward each other, providing a gap 94 therebetween. At opposite ends 96 and 98, the device support arms 82 and 84 include support, for example, having spring characteristics, such as spring fingers 100, 102, 104 and 106. The support spring fingers 100, 102, 104 and 106 may be used to support the active device 16 thereon. As will be described in greater detail below, the support spring fingers 100, 102, 104 and 106 may be resiliently cantilevered at the ends 96 and 98 of the device support arms 82 and 84 to release the active device 16 once it is connected, for example, to a PCB or other structure.

Referring briefly to FIG. 3, the active device 16 may be, for example, a transceiver module or any other device. In instances where optical device 16 is a transceiver module, the transceiver module 16 may include an optical engine 110 that provides optical-to-electrical and electrical-to-optical conversions. That is, electrical signals received by the transceiver module 16 may be converted to optical signals that can be transmitted through the optical fiber cable 18 and optical signals received by the transceiver module 16 from the optical fiber cable 18 can be converted to electrical signals. The transceiver module 16 may include a circuit board 112. The circuit board 112 may be organic or ceramic and may provide a carrier for components of the transceiver module 16. In the illustrated embodiment of FIGS. 2 and 3, the circuit board 112 is rectangular in shape, however, any other suitable shape may be used, such as rounded, circular or irregular shapes.

An electrical connector system, for example, a ball grid array (BGA) package 120 may be provided that includes an array 122 of conductive balls 124 that are used to electronically connect the transceiver module 16 to, for example, a PCB. The conductive balls 124 may be, for example, solder balls, gold balls, molded studs or electrically conductive plastics. In embodiments where solder balls are employed, a solder reflow process may be used to connect the transceiver module 16 to a PCB.

Figure 5:
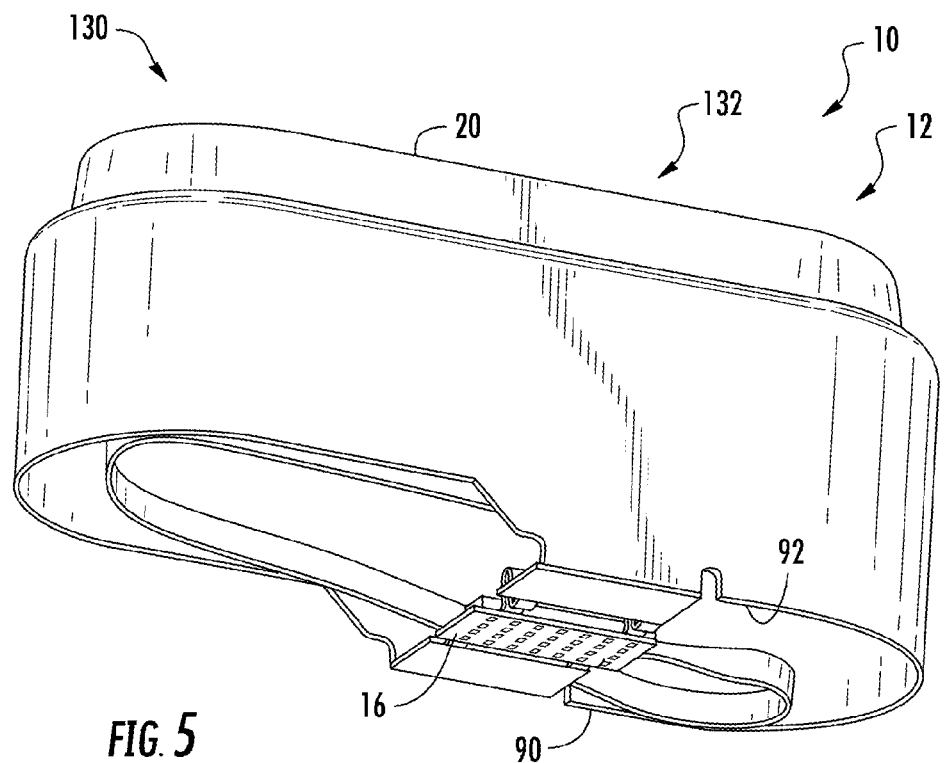
FIG. 5 is another side, perspective view of the optical subassembly of FIG. 1.

Referring now to FIGS. 4 and 5, any suitable shape may be used for the carrier module 12, depending on the placement parameters for the active device 16. In the illustrated example, the carrier module 12 may be tiered, having a first portion 130 having a first height dimension $H_1$ measured from the cover portion 20 to the ledge 90, 92 and a second portion 132 having a second height dimension $H_2$ also measured from the covered portion 20 to the ledge 90, 92. In some embodiments, $H_1$ may be less than $H_2$ or vice versa. Also, while only two tiered potions 130 and 132 are illustrated, more tiered portions may be employed. As will be described in greater detail below, the tiered first and second portions 130 and 132 can be provided to facilitate location and placement of the carrier module 12 and active device 16 during a placement operation. Additionally, placement features 134 (e.g., notches, grooves, projections, indicia, etc.) may be provided that further facilitate location and placement of the carrier module 12.

Figure 6:
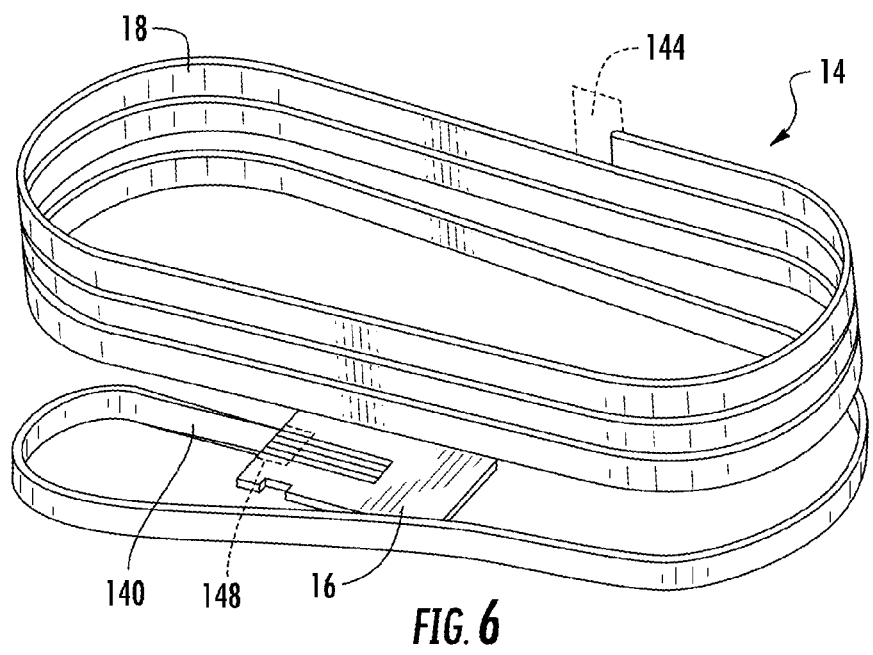
FIG. 6 is a perspective view of one embodiment of an active optical device assembly including an active device and an optical fiber cable pigtail for use in the optical subassembly of FIG. 1.

Referring to FIG. 6, the active optical device assembly 14 is illustrated in isolation. The active optical device assembly 14 includes the optical fiber cable 18 and the active device 16. The optical fiber cable 18 may be connected at one terminal 140 end to the active device 16 (e.g., using a ferrule represented by dotted lines 148). The other terminal end 142 of the optical fiber cable 18 may be connectorized (e.g., represented by dotted connector 144) or unconnectorized (e.g., for factory splicing or otherwise). In exemplary embodiments, the optical fiber (e.g., a single-mode fiber) may be operably pre-connected and pre-aligned to the active device 16 in a controlled environment (e.g., by the manufacturer) before installation of the active device 16 on a PCB. This can reduce the complexity of use of single-mode fibers in a device.

Figure 7:
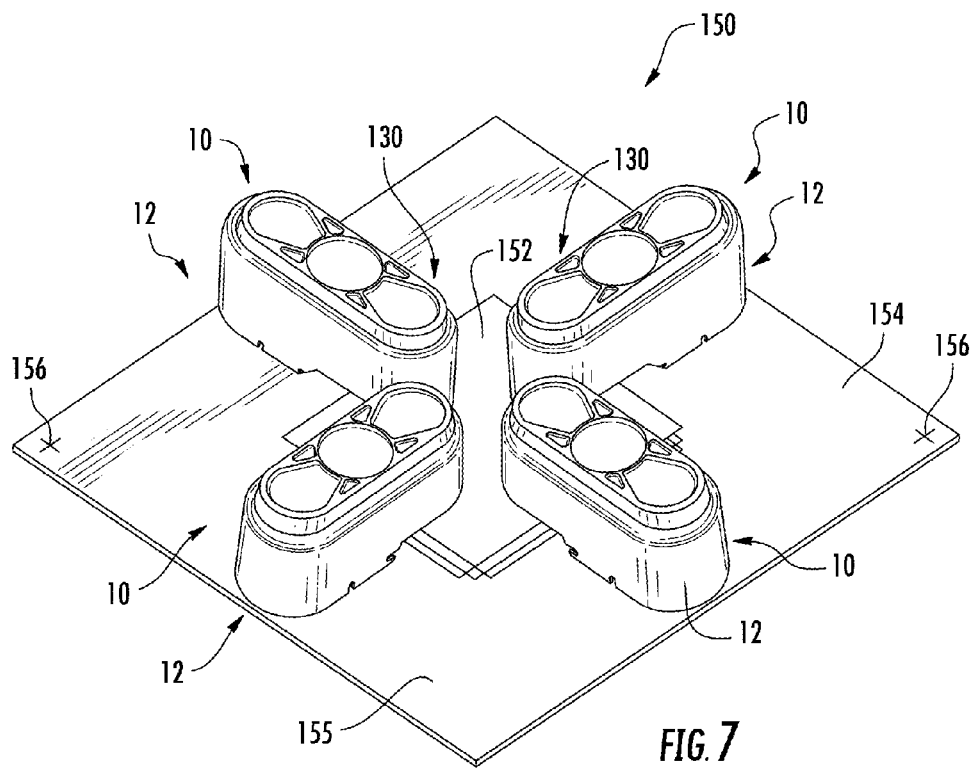
FIG. 7 is a perspective view of one embodiment of a device package being assembled using the optical subassembly of FIG. 1.

Referring to FIG. 7, an optical package 150 includes an IC 152 (e.g., a processor) connected to an interposer 154. A number of the optical subassemblies 10 including the carrier modules 12 and active optical device assemblies 14 (see FIG. 2) may be arranged about the IC 152 to place the active devices 16 adjacent the IC 152 to increase density. As can be seen, the first portions 130 overhang the IC as their heights $H_1$ (FIG. 5) may be less than the heights $H_2$ of the second portions 132 causing the first portions 130 to be spaced from the mounting surface 155 of the IC 152. Indicia 156 may be provided, for example, on the mounting surface 155 to provide a visual indication for placement of the optical subassemblies 10. Once accurately placed, the BGA package of the active device 16 may be soldered in a reflow process to the mounting surface 155 of the interposer 154.

The active optical device assembly 14 may be assembled in a controlled environment at a location spaced (e.g., a separate room and/or facility) than other components of the optical package to which it will be assembled. The active optical device assembly 14 may be assembled by connecting and accurately aligning the optical fiber cable 18 to the active device 16 such that optical signals can be transmitted to and from the active device 16. The active optical device assembly 14 may be assembled to the carrier module 12 to form the optical subassembly 10. The optical subassembly 10 may be assembled by coiling or otherwise controlled bending the optical fiber cable 18 within the volume 50 of the carrier module 12 in a somewhat flat orientation (FIG. 2). The active device 16 may then be located on the spring fingers 100, 102, 104, 106 of the device support arms 82 and 84. In some embodiments, the spring fingers 100, 102, 104, 106 may include engaging features that can engage the active device 16 and hold it in place thereon, leaving any BGA package 120 exposed for connecting to a mating surface. Once the optical subassembly 10 is assembled, the optical subassembly 10 can be transported to a different location for assembling an optical package. The active device 16 may then be connected to a mounting surface for forming the optical package.

Figure 8:
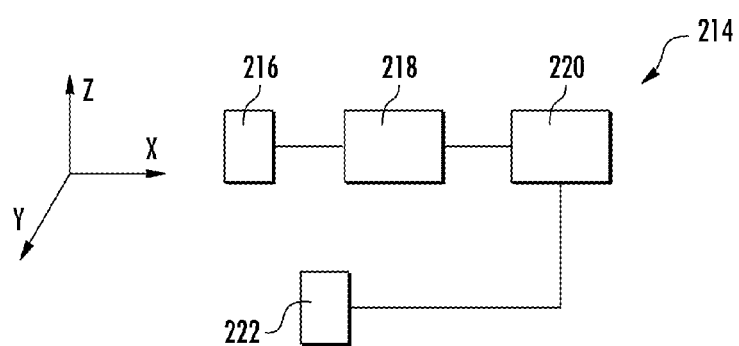
FIG. 8 is a schematic illustration of an embodiment of a pick and place apparatus.

The optical subassembly 10 may be fed or otherwise provided to a pick and place apparatus 214. FIG. 8 illustrates an example of the pick and place apparatus 214. The pick and place apparatus 214 may be configured to automatically place the optical subassembly onto a fixed reference or mating surface. The pick and place apparatus 214 may include a gripper 216 or other mechanism for manipulating the location of the optical subassembly 10. An actuator 218, which is controlled by a controller 220 may be used to actuate the gripper 216 (e.g., to grasp the optical subassembly 10) and/or move the gripper in the X, Y and Z directions. Various sensors may be provided to provide feedback to the controller 220. For example, one or more vision sensors 222 may operate in a look up/look down fashion using any indicia and the viewing area 42 (FIG. 1).

The pick and place apparatus 214 may be used to position the optical subassembly 10 on a mating surface (e.g., a PCB, IC, etc.). Positioning the optical subassembly on the mating surface also positions the active device 16, as described above. The active device 16 may be connected to the mating surface using the BGA package 120 (FIG. 3). The active device 16 may be connected to the mating surface using a manufacturing process including, for example, reflow soldering process where the entire optical subassembly 10 may be heated (e.g., to a process temperature of about 230 degrees or higher) to soften the solder material and cause it to flow. The solder hardens upon cooling, thereby electrically connecting and mechanically affixing the active device 16 to the mating surface. The carrier module 12 can be released and removed from the active device 16. The carrier module 12 can be released from the active device 16 by flexing the spring fingers 100, 102, 104 and 106 out of the plane of the active device 16. In some embodiments, the spring fingers 100, 102, 104 and 106 may be resilient such that the carrier module 12 can be reused multiple times. In other embodiments, the carrier module 12 may include breakable features that can break away from the carrier module 12 to release the active device 16. Releasing and removing the carrier module 12 from the active device also allows for removal of the optical fiber cable 18 from the volume 50, which can allow for attachment of the optical fiber cable 18 to, for example, another optical fiber cable or optical component. The length of the optical fiber cable 18 may depend on, for example, placement of the active device 16 and size of the optical package.

Because the entire optical subassembly 10 may be heated during the reflow soldering process, all of the components of the optical subassembly 10 should be configured to operate in the heated conditions (e.g., about 230° C. or greater). For example, high temperature plastics, ceramics and/or glass may be used to form the carrier module. High temperature ferrules (e.g., formed of silicon, glass, graphite, etc.) and fiber coatings (e.g., polyimide, silicone, etc.) may be used.

Figure 9:
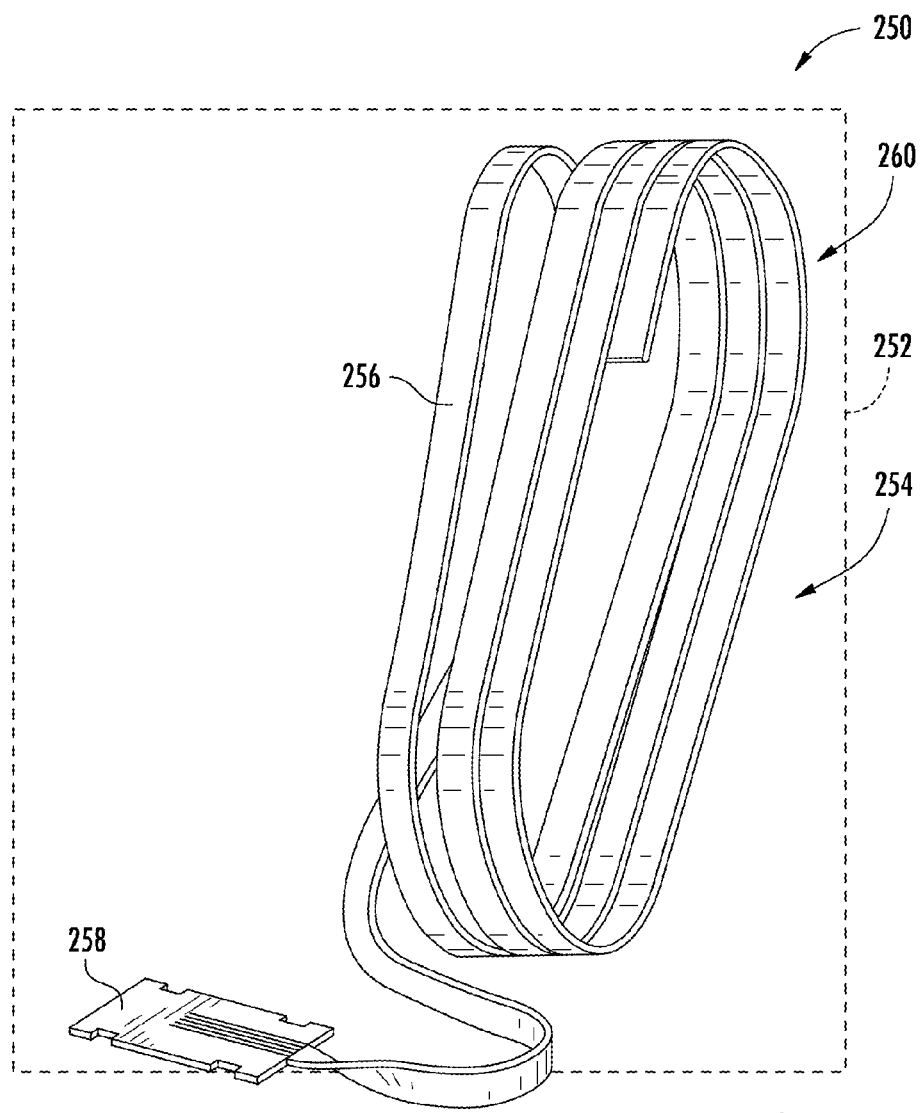
FIG. 9 illustrates another exemplary embodiment of an optical subassembly.

While the above-described optical subassembly 10 illustrates the optical fiber cable 18 in a somewhat flat coil arrangement, other arrangements are possible. Referring to FIG. 9, a vertical coil arrangement is illustrated for another embodiment of an optical subassembly 250 that includes a carrier module (represented by dashed lines 252) and an active optical device assembly 254 including an optical fiber cable 256 operably connected to an active device 258. Such a vertical arrangement for the coil 260 of the optical fiber cable 256 can reduce any need to overhang other areas or devices during installation and can reduce shadow.

Figure 10:
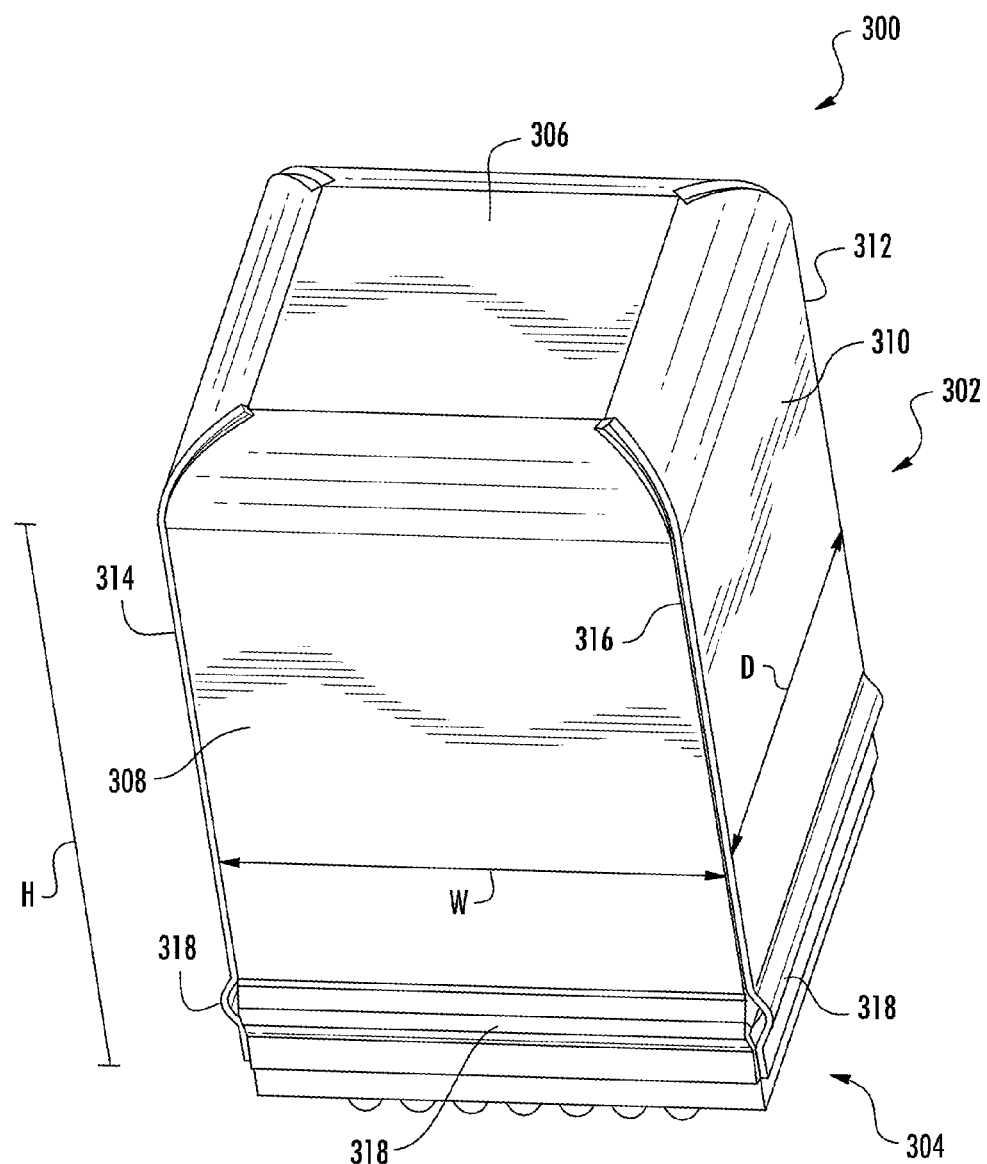
FIG. 10 illustrates another embodiment of an optical subassembly.

Referring now to FIG. 10, another exemplary optical subassembly 300 employing a vertical coil or otherwise wound arrangement is illustrated. The optical subassembly 300 includes a carrier module 302 and an active optical device assembly 304. In this embodiment, the carrier module 302 may have a height H that may be greater than a width W (e.g., between about 12 and 30 mm) and/or depth D (e.g., between about 12 and 30 mm) of the carrier module 302. The carrier module 302 includes a cover portion 306 and side portions 308, 310, 312 and 314 that extend outwardly from the cover portion 306. In some embodiments, adjacent side portions 308, 310, 312 and 314 may be disconnected along at least a portion of their heights (e.g., along a line 316 of disconnection) to allow some movement of adjacent side portions 308, 310, 312 and 314 relative to each other. The carrier module 302 may include device support structure (e.g., in the form of detents 318) that may be carried by the side portions 308, 310, 312, and 314. The detents 318 can releasably interlock with detents provided by the optical device assembly 304, as will be described below.

Figure 11:
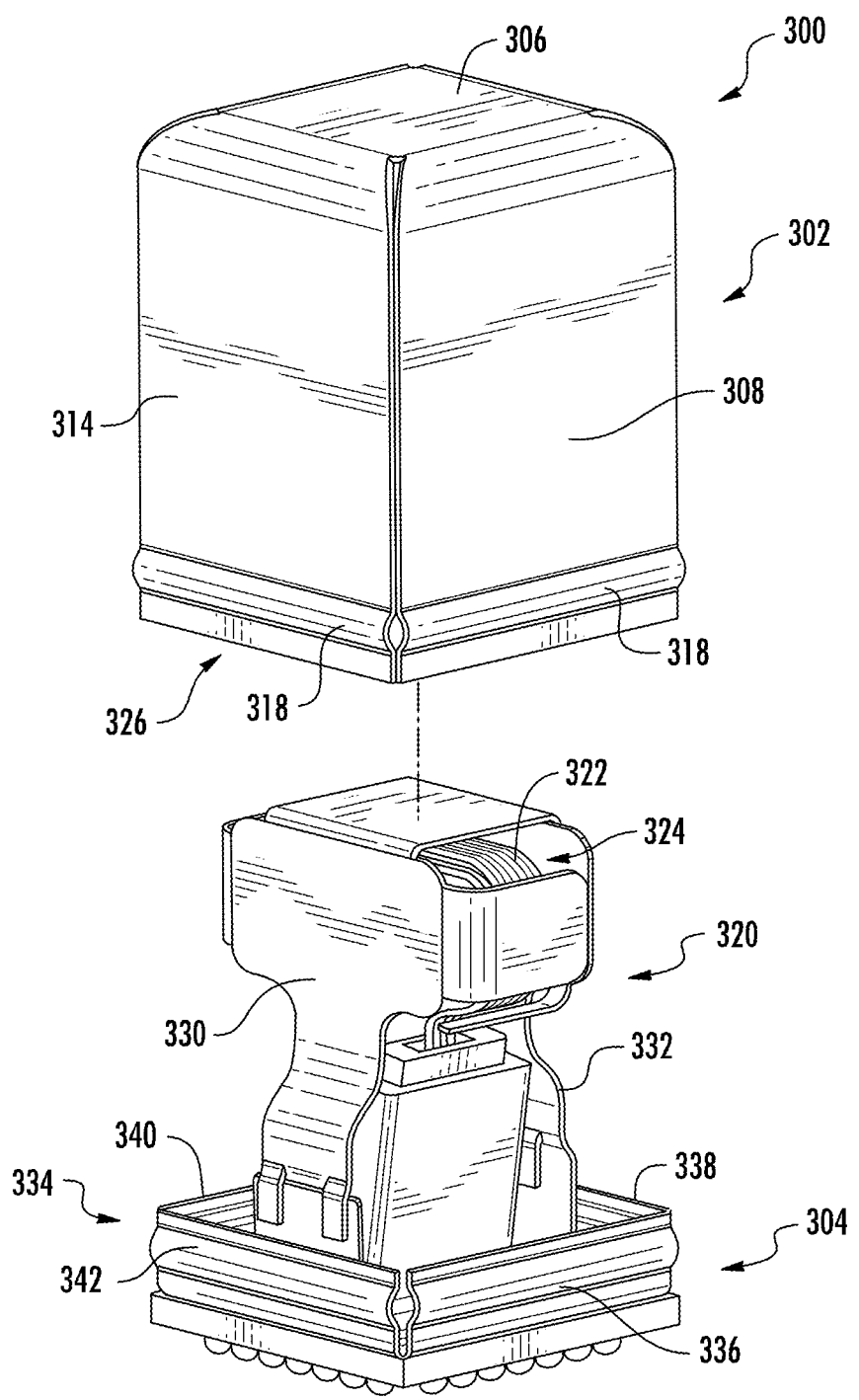
FIG. 11 illustrates the optical subassembly of FIG. 10 with a carrier module removed.

Referring to FIG. 11, the optical subassembly 300 is illustrated with the carrier module 302 removed. The optical subassembly 300 further includes a removable cable routing assembly 320 that may be used to contain an optical fiber cable 322 within a cable receiving space 324 that subdivides a containing volume 326 formed by the carrier module 302. In other words, the removable cable routing assembly 320 provides a "volume within a volume" or a subvolume that may be used to house the coiled or wound optical fiber cable 322 spaced from the side portions 308, 310, 312 and 314 of the carrier module 302. Such a segregated arrangement can reduce unintended interference between the carrier module 302 and the optical fiber cable 322 during removal of the carrier module 302, as shown by FIG. 12.

The cable routing assembly 320 includes a first cable support member 330 and a second cable support member 332 that cooperates with the first cable support member 330 to provide the cable receiving space 324 within the containing volume 326. The first and second cable support members 330 and 332 may be releasably connected to a base assembly 334 that may be part of the active optical device assembly 304. The base assembly 334 includes interlocking members 336, 338, 340 and 342 that releasably interlock with the detents 318 of the side portions 308, 310, 312 and 314. In some embodiments, the interlocking members 336, 338, 340 and 342 and the base assembly 334 may even remain with the active optical device assembly 304, even after removal of the cable routing assembly 320 and release of the optical fiber cable 322 to protect components of the active optical device assembly 304.

Figure 12:
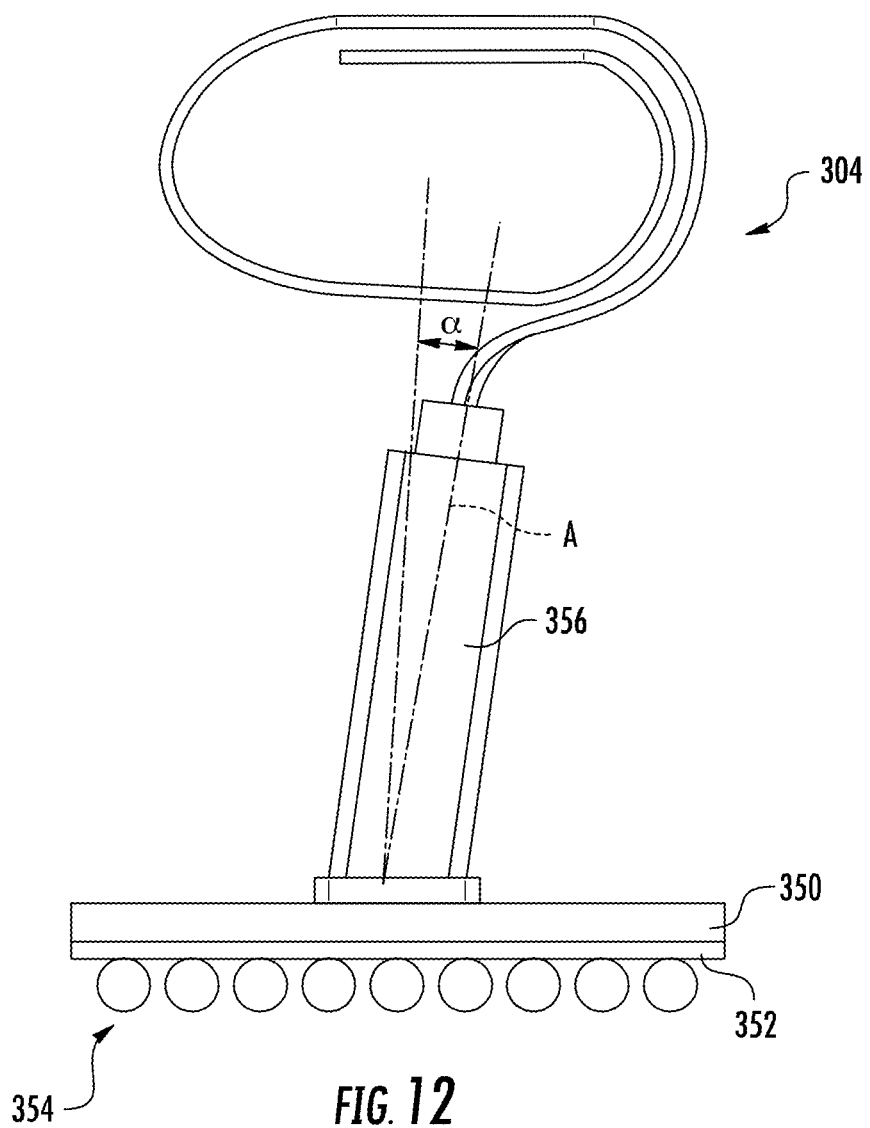
FIG. 12 illustrates an embodiment of an active optical device assembly for use with the optical subassembly of FIG. 10.

Referring to FIG. 12, components of the active optical device assembly 304 are illustrated. The active optical device assembly 304 may include many of the components described above, such as an active device 350 (e.g., a transceiver), a circuit board 352 and a BGA package 354. In an exemplary embodiment, however, a ferrule 356 may be situated out of the plane of the active device 350 and may be connected to the active device 350 in an offset vertical orientation. The ferrule 356 may have a central axis A that extends through the geometric center of the ferrule 356 that may be at an angle α to vertical. Etched grooves, gratings, etc. May be used to operably connect the ferrule 356 to the active device 350.

The above-described optical subassemblies and associated methods can provide integrated silicon photonics solutions by providing the ability to populate PCBs or other substrate or mounting surface with optical engines to accommodate current manufacturing environments. Being able to store enough fiber optic "slack" inside the carrier module (e.g., 10 cm or more), yet still allow dense packing of the PCB surface may be desirable. Providing a viewing area can facilitate a pick and place process to access indicia on the PCB itself. By making the various components reflow temperature compatible, the entire assembly can be placed, subjected to a reflow process, and then the carrier module released to access the optical fiber cable pigtail.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical subassembly comprising:
    an active optical device assembly comprising:
        an active device; and
        an optical fiber cable operably connected to the active device that sends optical signals to the active device and receives optical signals from the active device; and
    a carrier module comprising:
        a cover portion;
        side portions that extend from the cover portion, wherein the cover portion and the side portions provide a cable receiving space that receives the optical fiber cable therein; and
        a device support structure that supports the active device for placement on a mating surface during a controlled manufacturing operation, the device support structure comprising:
            a first device support arm extending from one of the side portions; and
            a second device support arm extending from the other of the side portions and toward the first device support providing a gap therebetween.

2. The optical subassembly of claim 1, wherein the cable receiving space receives the optical fiber cable therein in a bend controlled arrangement.

3. The optical subassembly of claim 1, wherein the carrier module includes end portions that are rounded in shape and connect the side portions.

4. The optical subassembly of claim 3, wherein the side portions and end portions form a track shape that controls a bend radius of the optical fiber cable located in the cable receiving space.

5. The optical subassembly of claim 1, wherein the cover portion has a viewing area that allows viewing into the cable receiving space.

6. The optical subassembly of claim 5, wherein the viewing area comprises a window at least partially formed of a material selected from a group consisting of air space, glass, plastic and screen materials.

7. The optical subassembly of claim 1, wherein the device support structure further comprises at least one support spring finger extending from the first device support arm toward the gap, and at least one support spring finger extending from the second device support arm toward the gap, and wherein each at least one support spring finger releasably engages the active device.

8. The optical subassembly of claim 1, wherein the active device includes an electrical connector system that is exposed within the gap.

9. The optical subassembly of claim 1, wherein the active device is a transceiver module.

10. The optical subassembly of claim 1, wherein the optical fiber cable comprises a single-mode optical fiber.

11. The optical subassembly of claim 1, wherein the carrier module is formed of a high-temperature material configured to operate in manufacturing process conditions of up to about 230° C.

12. The optical subassembly of claim 1 further comprising a cable routing assembly releasably located in the carrier module and providing the cable receiving space.

13. The optical subassembly of claim 1, wherein the active optical device assembly comprises a base assembly including interlocking members.

14. A method of providing an optical subassembly, the method comprising:
    forming a controlled bending of an optical fiber cable of an active optical device assembly, the controlled bending of the optical fiber cable located within a cable receiving space of a carrier module, the optical fiber cable having a first terminal end operably connected to an active device and a second terminal end located in the cable receiving space, wherein the carrier module comprises:
        a cover portion;
        side portions that extend from the cover portion, wherein the cover portion and the side portions provide a cable receiving space that receives the optical fiber cable therein;
        a device support structure comprising:
            a first device support arm extending from one of the side portions; and
            a second device support arm extending from the other of the side portions and toward the first device support providing a gap therebetween; and
    supporting the active device using the first device support arm and the second device support arm of the device support structure of the carrier module for placement on a mating surface during a controlled manufacturing operation.

15. The method of claim 14, further comprising retaining the optical fiber cable using retaining projections located within the volume of the carrier module.

16. The method of claim 14, further comprising operably connecting the first terminal end of the optical fiber to the active device before locating the controlled bending of the optical fiber cable within the volume of the carrier module.

17. The method of claim 14, wherein the second terminal end of the optical fiber cable includes a connector.

18. The method of claim 14, wherein the active device is a transceiver module.

19. The method of claim 14, wherein the optical fiber cable comprises a single-mode optical fiber.

20. The method of claim 14, wherein the first terminal end of the optical fiber cable is connected to a ferrule that is situated out of the plane of the active device and being operably connected thereto.

21. The method of claim 14, wherein the carrier module is formed of a high-temperature material configured to operate in manufacturing process conditions of up to about 230° C.

22. A pick and place method of connecting an active device to a mating surface, the method comprising:
    positioning an optical subassembly on the mating surface using a pick and place apparatus, the optical subassembly comprising:
        an optical device assembly comprising the active device and an optical fiber cable operably connected to the active device that sends optical signals to the active device and receives optical signals from the active device; and
        a carrier module comprising:
            a cover portion;
            side portions that extend from the cover portion, wherein the cover portion and the side portions provide a cable receiving space that receives the optical fiber cable therein; and
            a device support structure comprising:
                a first device support arm extending from one of the side portions; and
                a second device support arm extending from the other of the side portions and toward the first device support providing a gap therebetween; and
    operably connecting the active device to the mating surface.

23. The method of claim 22, wherein the step of operably connecting the active device to the mating surface includes heating the optical subassembly to a temperature of at least about 230° C. for a reflow soldering process.

24. The method of claim 22, further comprising releasing the active device from the carrier module and removing the carrier module thereby exposing the optical fiber cable.

25. The method of claim 22, wherein the mating surface is provided by a printed circuit board.

26. The method of claim 22, wherein the active device comprises a transceiver module.

27. The method of claim 26, wherein the transceiver module is connected to the mating surface adjacent a processor connected to the mating surface.

28. The method of claim 27, wherein the step of positioning the optical subassembly on the mating surface comprises positioning the carrier module on the mating surface such that at least a portion of the carrier module overhangs the processor.

29. The method of claim 22, wherein the optical fiber cable comprises a single-mode optical fiber.

30. The method of claim 22, further comprising releasing the active device from the carrier module and removing the carrier module thereby exposing a cable routing assembly.

* * * * *